United States Patent
Sanchez et al.

(10) Patent No.: US 7,533,062 B2
(45) Date of Patent: May 12, 2009

(54) METHOD FOR CREATING SELF-AUTHENTICATING DOCUMENTS

(75) Inventors: Luis A. Sanchez, Hamden, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 859 days.

(21) Appl. No.: 11/139,251

(22) Filed: May 27, 2005

(65) Prior Publication Data

US 2006/0282672 A1 Dec. 14, 2006

(51) Int. Cl.
*G06F 17/60* (2006.01)

(52) U.S. Cl. .......................... 705/51; 705/57; 380/202; 283/73

(58) Field of Classification Search ................ 705/57, 705/58, 50, 51; 380/200, 201, 202; 713/176
See application file for complete search history.

(56) References Cited

U.S. PATENT DOCUMENTS

| | | | |
|---|---|---|---|
| 4,677,435 A | 6/1987 | D'Agraives et al. | 340/825.31 |
| 5,325,167 A | 6/1994 | Melen | 356/71 |
| 5,521,984 A | 5/1996 | Denenberg et al. | 382/209 |
| 6,212,504 B1* | 4/2001 | Hayosh | 705/64 |
| 6,292,092 B1* | 9/2001 | Chow et al. | 340/5.6 |
| 6,584,214 B1 | 6/2003 | Pappu et al. | 382/108 |
| 6,611,598 B1 | 8/2003 | Hayosh | 380/54 |
| 7,152,047 B1* | 12/2006 | Nagel | 705/76 |
| 2003/0219145 A1 | 11/2003 | Smith | 382/100 |
| 2004/0133783 A1 | 7/2004 | Tonnesland et al. | 713/176 |
| 2005/0038756 A1* | 2/2005 | Nagel | 705/76 |
| 2005/0125360 A1* | 6/2005 | Tidwell et al. | 705/65 |
| 2006/0145469 A1* | 7/2006 | Lubrino et al. | 283/72 |

OTHER PUBLICATIONS

FiberFingerprint Identification, Eric Metois et al. pp. 147-154.
Internet Printout, Escher Group, Ltd. Website reference.

* cited by examiner

*Primary Examiner*—Calvin L Hewitt, II
*Assistant Examiner*—Steven Kim
(74) *Attorney, Agent, or Firm*—George M. Macdonald; Angelo N. Chaclas (57) ABSTRACT

In accordance with an embodiment of the invention, a method for creating a self-authenticating document is disclosed. The method comprises: providing a base substrate forming the document; printing an authentication seal on the document, the authentication seal comprising a printed portion comprising an ink creating a bleed area on the document where the ink and the substrate interact; and obtaining unique bleed properties of the bleed area. The bleed properties are obtained by scanning the bleed area upon termination of bleeding or drying to provide a description of the ink and substrate interaction to generate an identifier code representing the unique bleed properties. The method further comprises generating a signature of the identifier code, encoding the identifier code in an information carrier, and associating the information carrier with the document or storing the signed identifier code in a remote verification seal code that is not printed on the document. The authentication seal is capable of being scanned and compared to the information carrier or to the remote verification seal code, wherein the verification seal code is not located on the document and comprises the same code information as the identifier code.

20 Claims, 8 Drawing Sheets

X COORDINATES OF EDGE 5, 3, 5, 6, 4

FIG.14

METHOD FOR CREATING SELF-AUTHENTICATING DOCUMENTS

BACKGROUND OF THE INVENTION

1. Field of the Invention

The present invention relates generally to document security and, more particularly, to a method for creating self-authenticating documents, and such self-authenticating documents.

2. Background Information

There is a great desire to decrease the fraudulent use of valuable documents, such as personal checks, postal money orders, clothing tags, and other important labels and documents. With the advances in modern technology of devices, such as color printers, copy machines, and scanners, counterfeit reproductions of the above valuable documents may often be produced with ease by criminals resulting in difficulty in the detection of the original from the forged copy.

Accordingly, there is a need for a method for creating self-authenticating documents, and documents that are self-authenticating.

SUMMARY OF THE INVENTION

In accordance with one embodiment of the invention, a method for creating a self-authenticating document is disclosed. The method comprises: providing a base substrate forming the document; printing an authentication seal on the document, the authentication seal, comprising a printed portion comprising an ink creating a bleed area on the document where the ink and the substrate interact; and obtaining unique bleed properties of the bleed area. The bleed properties are obtained by scanning the bleed area upon termination of bleeding or drying to provide a description of the ink and substrate interaction to generate an identifier code representing the unique bleed properties. The method further comprises generating a signature of the identifier code, encoding the identifier code in an information carrier, and associating the information carrier with the document or storing the signed identifier code in a remote verification seal code that is not printed on the document. The authentication seal is capable of being scanned and compared to a scan of the information carrier or the remote verification seal code, wherein the verification seal code comprises the same code information as the identifier code.

In accordance with another embodiment of the invention, a document bearing record entries is disclosed, wherein the document is capable of being authenticated against data obtained from the document during a scan of an authentication seal on the document. The document comprises: a base substrate forming the document; and the authentication seal on the document comprising a printed portion comprising an ink creating a bleed area on the document where the ink and the substrate interact. The document further comprises unique bleed properties formed by the bleed area, which bleed area is capable of being scanned upon termination of drying or bleeding to provide a description of the ink and substrate interaction to generate an identifier code representing the unique bleed properties; and an information carrier on the document comprising the identifier code. The authentication seal is capable of being scanned and compared to a scan of the information carrier or to a remote verification seal code, wherein the verification seal code is not printed on the document and comprises the same code information as the identifier code.

In accordance with a further embodiment of the invention, a method of producing an authentication seal is disclosed. The method comprises providing a base substrate forming a document; and printing the authentication seal on the document. The authentication seal comprises a printed portion comprising an ink creating a bleed area on the document where the ink and the substrate interact. The unique bleed properties of the bleed area are obtained by scanning the bleed area upon termination of bleeding or drying to provide a description of the ink and substrate interaction to generate an identifier code representing the unique bleed properties which is encoded in an information carrier on the document or stored in a remote verification seal code. The authentication seal is capable of being scanned and compared to a scan of the information carrier or the remote verification seal code, wherein the remote verification seal code comprises the same code information as the identifier code.

In accordance with another embodiment of the invention, a method of verifying the authenticity of a document is disclosed. The method comprises providing the afore-described document bearing record entries; and scanning the authentication seal and comparing to a scan of the information carrier. If the bleed properties are the same as the identifier code then the document is verified as authentic.

Further disclosed in accordance with an embodiment of the invention, is a method of verifying the authenticity of a document, comprising providing the afore-described document bearing record entries. The method also comprises scanning the authentication seal and comparing to a scan of the remote verification seal code; wherein if the bleed properties are the same as the identifier code then the document is verified as authentic.

BRIEF DESCRIPTION OF THE DRAWINGS

The foregoing aspects and other features of the present invention are explained in the following description, taken in conjunction with the accompanying drawings, wherein.

DETAILED DESCRIPTION

In accordance with an embodiment of the invention, a method for creating a self-authenticating document that includes a barcode comprising information about unique intercolor bleed on the same substrate of two different colors printed side by side is disclosed. This unique intercolor bleed is a fingerprint of the substrate and is advantageously printed on the original document. It can be read, decoded, and the results compared to an optical analysis of the same color interface on the document. The document can be identified as a copy upon finding a mismatch between the barcode information and the interface optical analysis. The fingerprint can be cryptographically signed to authenticate the origin of the document. This method is also advantageously applicable to printing with a single ink. In the case of a single ink, the unique bleed pattern depends on the interaction between the single ink and the substrate.

Thus, an embodiment of the invention solves a problem in the art by printing two different colors (e.g., yellow and black, preferably dye based inks), optically analyzing the dried liquid-liquid interface, and then generating a description of the ink-to-paper interaction at the interface between the two inks. The terms "dried liquid-liquid interface" and "upon drying" can refer not necessarily to complete drying, but to the point in time where a stable image is formed by the interface between the two inks. The mixing of the different ink colors at the liquid-liquid interface is a unique signature modulated by the media substrate. This interaction information, captured by a scanner device (e.g., image scanner), is transformed into a unique document identifier and printed as a barcode in the same document or encoded before barcoding into the document.

Figure 1:
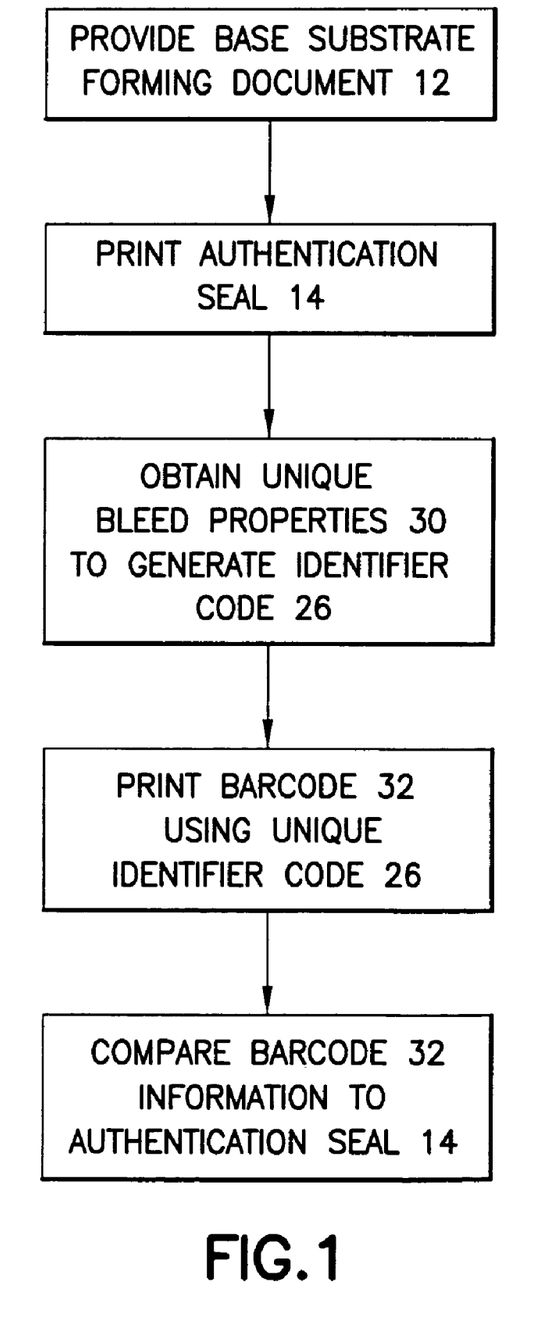
FIG. 1 is a schematic illustration in block diagram form of a method for creating a self-authenticating document incorporating features of an embodiment of the invention.

Accordingly, in accordance with one embodiment of the invention, a method for creating a self-authenticating document comprises providing a base substrate forming the document. Referring to FIG. 1, there is schematically shown in block diagram form a method for creating a self-authenticating document incorporating features of an embodiment of the invention. Although the invention will be described with reference to the embodiments shown in the drawings, it should be understood that the present invention can be embodied in many alternate forms of embodiments. In addition, any suitable size, shape or type of elements or materials could be used.

Figure 2:
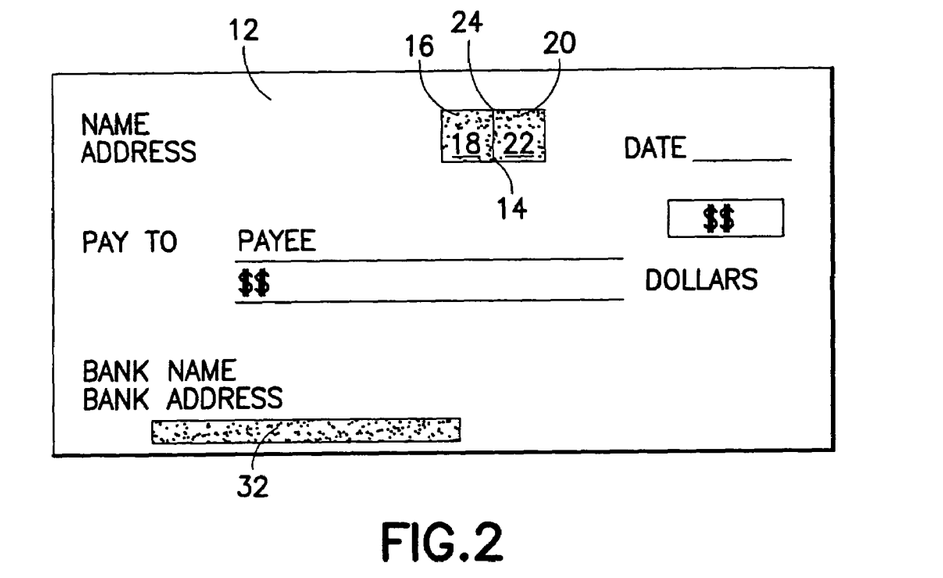
FIG. 2 shows document 12 as a check in accordance with an embodiment of the invention.

In the method of FIG. 1, a document 12 of value is provided. Document 12 refers to any desired substrate and is typically a paper document including, but not limited to, personal checks, travelers checks, commercial checks, postal money orders, clothing tags, mail pieces, etc. FIG. 2 shows document 12 in the form of a personal check.

An authentication seal 14, which can be of any suitable size, shape, and location on the document 12, may be printed on the document 12 using liquid ink printing techniques, such as ink jet or letter press printing. For example, the authentication seal 14 may be rectangular, square, circular or in any other desired shape and pattern. The authentication seal 14 comprises a printed portion comprising an ink creating a bleed area 24 on the document 12 where the ink and the substrate interact. The ink is typically a normal printer dye based ink. For example, non-luminescent black or yellow ink may be employed, although any suitable color ink may be used.

Figure 3:
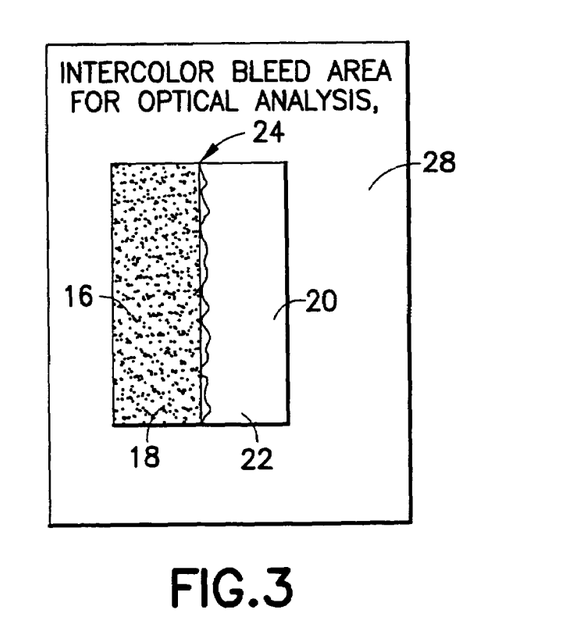
FIG. 3 schematically shows stable interface (dried liquid or stable image) DL zone 28, which is a portion of the bleed area 24 to be optically analyzed, with multiple ink usage in accordance with an embodiment of the invention.

The authentication seal 14 may also comprise more than one printed ink. As an example, two lines of different color ink can be printed in a side-by-side fashion in any desired shape as seal 14. As shown in FIGS. 2 and 3, authentication seal 14 can comprise a first portion 16 of a first ink 18 and a second portion 20 of a second ink 22. The first and second portions 16, 20 each preferably comprise normal printer dye based ink. For example, non-luminescent black ink can be used for one of the portions and a non-luminescent yellow ink can be used for the other. However, any suitable color ink may be employed for the first and second portions 16, 20 as long as the two inks are not the same.

The bleed area 24 represents the area where the ink interacts with the substrate, and in the case of use of the first and second inks 18, 22, the bleed area 24 is an intercolor bleed area representing the area on the document where the ink 18, ink 22 and substrate interact, as shown in FIG. 3.

Figure 4:
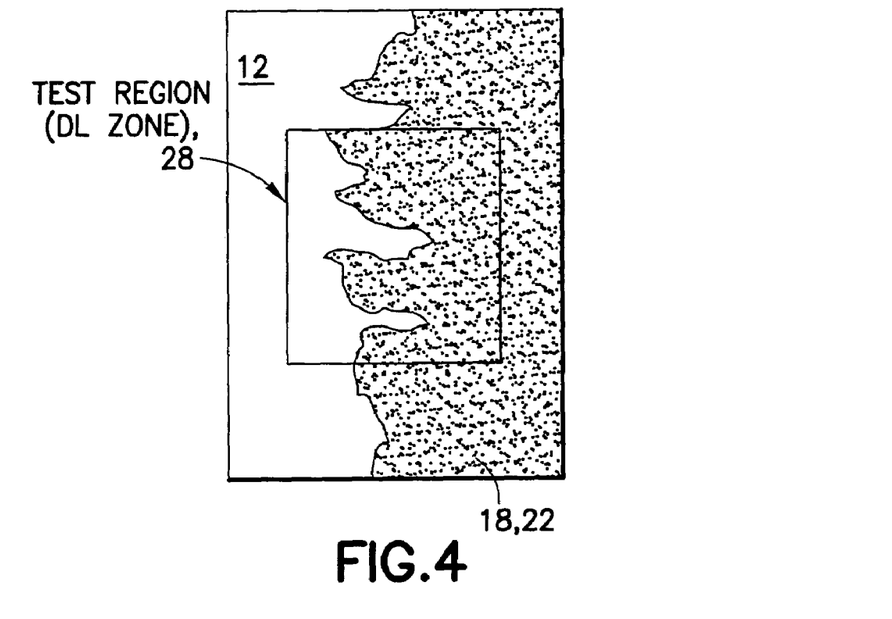
FIG. 4 schematically shows an enlarged view of a portion of FIG. 3.
Figure 5:
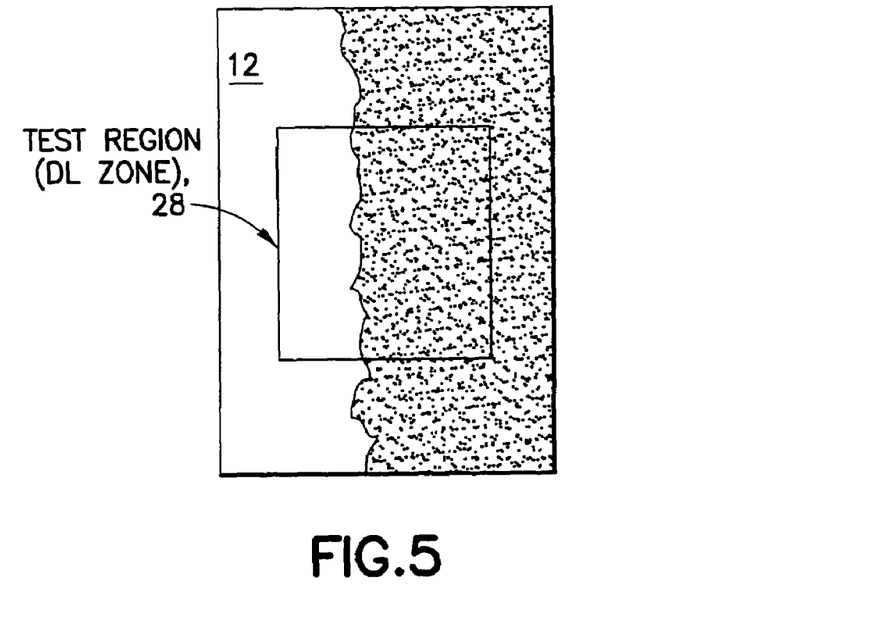
FIG. 5 schematically shows stable interface DL zone 28 when a single ink is employed in accordance with an embodiment of the invention.

The unique bleed properties of the bleed area 24 may be obtained by scanning the bleed area 24 upon drying with conventional scanning equipment to provide a description of the ink and substrate interaction. This information can then be used to generate an identifier code 26, as described in further detail below. For example, the bleed area 24 may be an intercolor bleed area, as shown in FIGS. 2 and 3, which is created upon printing of the first and second portions 16, 20. Upon drying, a dried liquid-liquid interface results. FIG. 3 schematically shows a portion of an authentication seal 14 as a test region or stable interface or dried liquid zone 28. FIG. 4 is a schematic enlarged view of FIG. 3 showing the intercolor bleeding of inks 18, 22 and showing test region or stable interface zone 28 denoted by the square region. Similarly, FIG. 5 shows a test region or stable interface zone 28 with use of a single ink. These regions may be optically analyzed to generate a description of the ink-to-ink substrate interaction at the interface between the first color ink 18 and the second color ink 22 or a description of the ink to substrate interaction in the case of a single ink. In particular, an image scan of the bleed area 24, such as the test region 28 of the authentication seal 14, using conventional image scanning equipment, may be taken to obtain a set of the unique bleed properties 30. These properties 30, which are unique to the particular substrate and inks employed, can then be used to generate the unique identifier code 26. Advantageously, the bleed area 24 from which the properties 30 are derived is a unique fingerprint of the substrate of document 12.

Various properties may be used to generate the identifying code 26 including, but not limited to, edge raggedness, line width, etc. Thus, several print quality parameters can be used to generate the code 26. Examples of how some could be implemented include the following:

Width of the interface region: set an upper and lower threshold grey-level; measure the mean distance between the threshold contours;

Fractal dimension of the edge length: set a threshold and obtain a high resolution contour; for a set of length scales, measure the length of the contour; fit a power law to length of contour versus length scale;

Print growth: measure the increase of mean distance across a line over the nominal value from the bitmap;

Raggedness: use ISO/IEC 13660 definition, e.g., the appearance of geometric distortion of an edge from its ideal position; a ragged edge appears rough or wavy rather than smooth or straight; the measure of raggedness is the standard deviation of the residuals from a line fitted to the edge threshold of the line (calculated perpendicular to the fitted line);

Blur: use a peak value of the derivative, that is the derivative at the inflection point.

Figure 6:
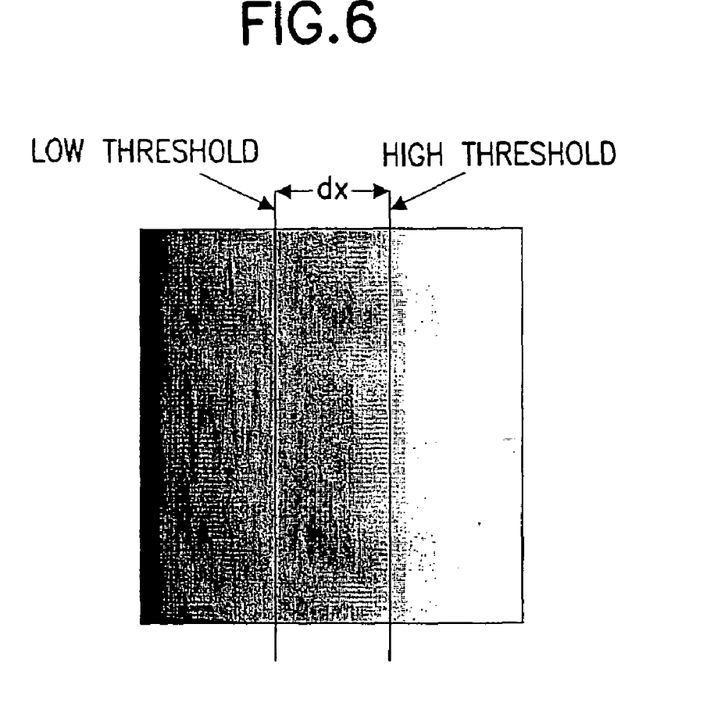
FIG. 6 shows an example of blur width, which may be used to generate identifying code 26 in accordance with aspects of the invention.
Figure 7:
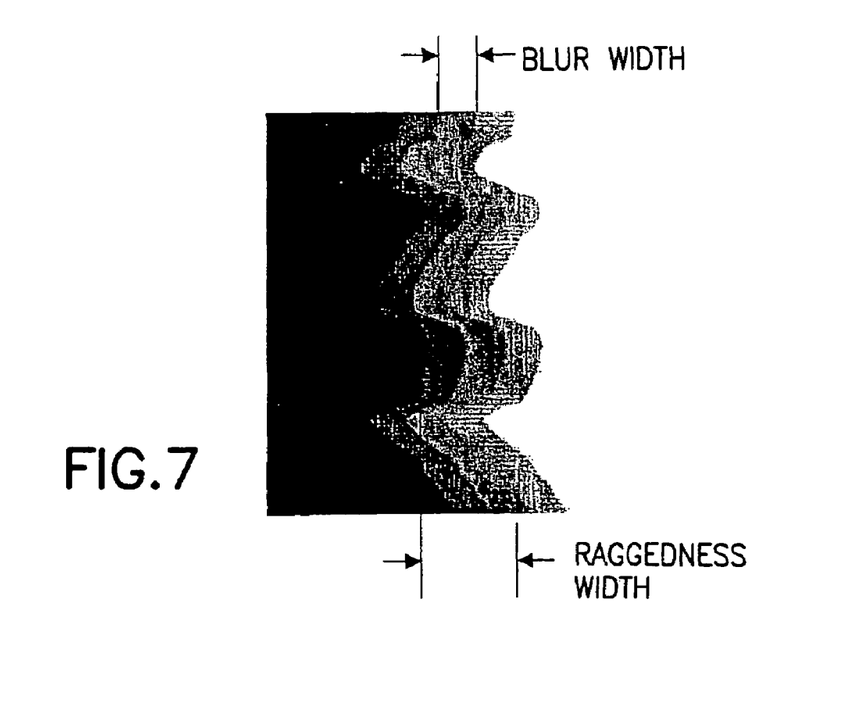
FIG. 7 shows an example of a jagged line with blur, which may be used to generate identifying code 26 in accordance with aspects of the invention.

FIG. 6 shows an example of the difference between a low and high threshold (width dx). The blur width dx depends on the diffusion of ink across the paper. The blur may be measured by comparing the area between the two thresholds. FIG. 7 illustrates an example of a jagged line with blur. A jagged line has blur and raggedness. The blur may be measured by comparing the area between the two thresholds, as noted above, and the raggedness may be measured by determining the standard deviation of one threshold around a nominal value.

Figure 8:
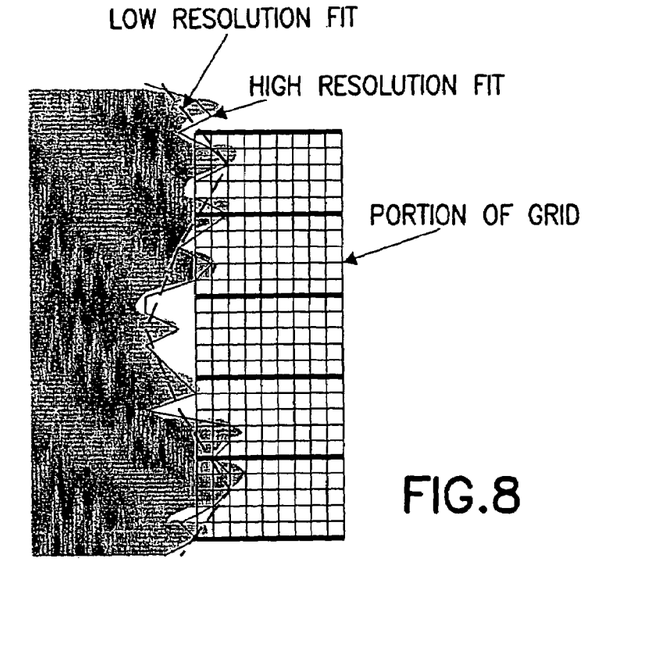
FIG. 8 shows an example of fit to edge, which may be used to generate identifying code 26 in accordance with aspects of the invention.

FIG. 8 illustrates a schematic of a low and high resolution fit to edge. The length of a piecewise linear continuous curve fit to the threshold edge is dependent on the resolution. A higher resolution fit produces a longer curve. The ratio of the lengths compared to the ratio of resolutions gives an estimate of the fractal dimension f. If the curve defined by the threshold is smooth, then f is close to 1. If the curve is ragged on the scale of the high resolution fit then f is larger than 1. While f may be loosely referred to as a fractal dimension, for a true fractal dimension of a curve, the length may be evaluated at multiple resolutions:

$$\left(\frac{dx_{low}}{dx_{high}}\right)^{1-f} = \left(\frac{Length_{low}}{Length_{high}}\right).$$

Figure 9:
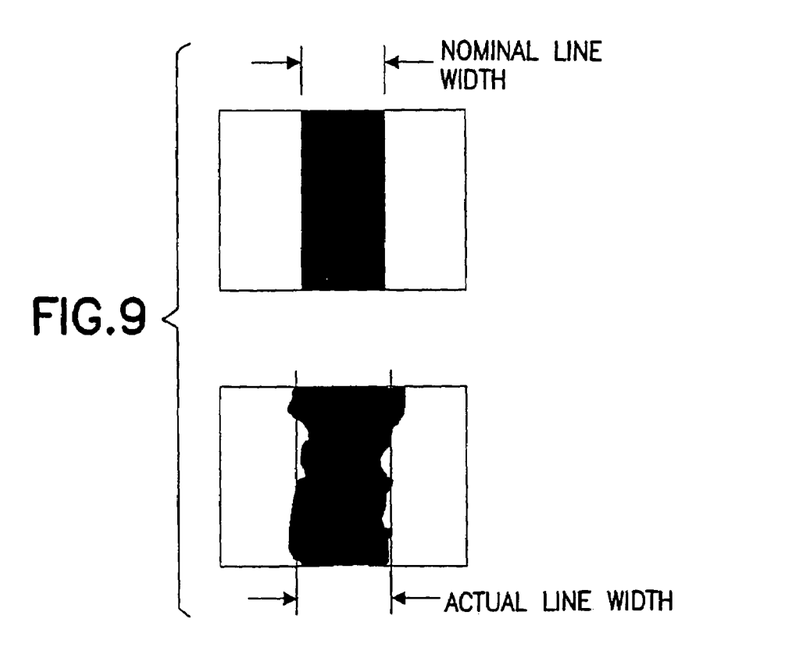
FIG. 9 shows an example of print growth, which may be used to generate identifying code 26 in accordance with aspects of the invention.

An example of print growth is set forth in FIG. 9, wherein the print growth is half the difference between actual line width and nominal line width.

Figure 10:
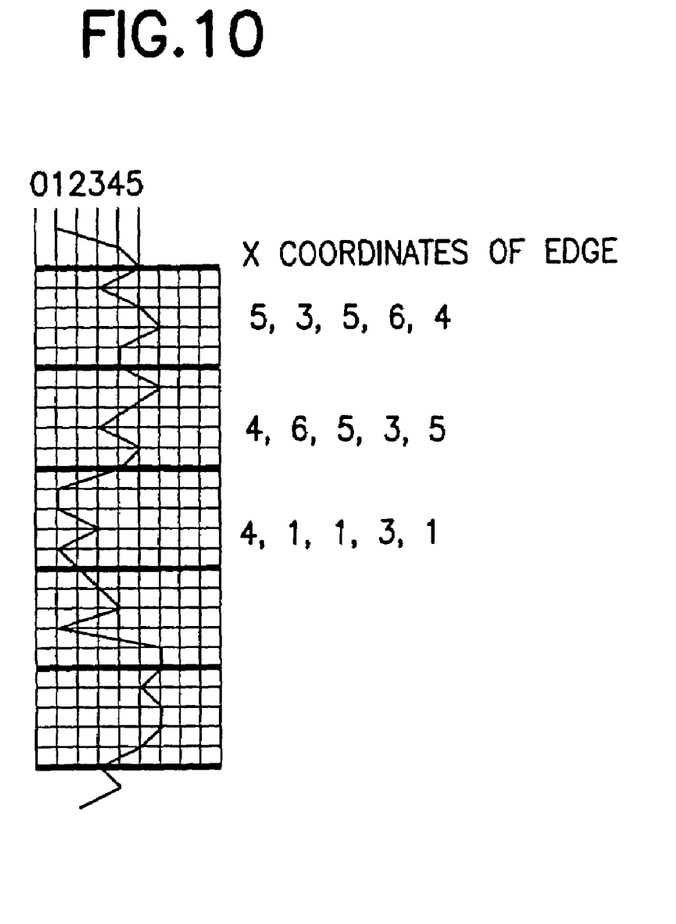
FIG. 10 shows an example of coordinates of an edge, which may be used to generate identifying code 26 in accordance with aspects of the invention.

FIG. 10 schematically shows coordinates of an edge. The coordinates of an edge can be approximately reproduced in a scan, and there also may be an offset.

Factors such as blur, edge raggedness, print growth, and fractal dimension can serve as the input for the identifying code 26. The coordinates of the edge also can be used directly. These coordinates may not reproduce exactly, but the measured shape of the edge from a scan can be compared to the edge coordinates found in the identifying code 26. Once the unique identifying code 26 is generated, an authentication authority may sign the identifying code 26. For example, a cryptographic signature may be generated using conventional standards based digital signature technology. Typically, this process involves the use of signature using and receiving systems, wherein the signature using system requests the user to perform a cryptographic signature on the data presented. The signature and signed data may then be transmitted to the receiving system, which has a cryptographically binding relationship between the presented data and signed data. Reference is herein made to the widely used PKI (Public Key Infrastructure) system for cryptographically signing and authentication, which is well known in the art. In the PKI system a pair of electronic keys is issued, which includes a private and public key. The private key is known to the user only or the user's signature device. The public key may be known by a second party intended to receive the signed data. The object to be signed and the private key are typically inputs to an algorithm, which outputs the data in a signed format. On the receiving end, the signed data and the pubic key are inputs to another algorithm, which extracts the original data from the signed data. The information will be correctly extracted only if the private key signed the information. Thus, the receiving party can be ensured that the data was signed by the intended user when using the user's public key for extraction of the signed information. The identifying code 26 may, for example, be constructed by concatenating the raggedness, blur, print growth, and coordinates of some edge points in the region of interest. Information identifying the signer and the signing key also may be added to the identifying code 26. The signature may be generated using standard cryptographic algorithms such as DSA, ECDSA, or RSA.

A barcode 32 comprising the identifying code 26 may then be printed on any desired location of document 12 using standard printing techniques or any desired digital printing technology. Conventional barcodes are used in many applications for the identification, tracking, and tracing of letters, objections, or packages. Some applications require only very basic information about an object (identity or destination) while other applications require detailed information about an object (e.g. postage paid, origin address, postage meter number, sender, addressee, destination address, weight, date, contents, batch number, etc.) Conventional barcodes are also used extensively for the identification of objects for sale; for example the Universal Product Code (UPC), and in many other applications.

Accordingly, generating a signature of the identifying code 26 in inventive barcode 32 can allow many various and valuable documents 12 to be self-authenticated. Barcode 32 may also comprise other information including, but not limited to, the afore-referenced information, the signature, the public key for verifying the signature and a certificate authenticating the association of the user identifier and the public key.

Barcode 32 printed on document 12 may be scanned and preferably compared to a scan of the authentication seal 14, such as a scan of test region 28, to determine if the information matches and thus the document 12 is authentic.

It is noted that barcode 32 is an example of an information carrier. The information carrier may be in the form of any printed symbology, including but not limited to, text, a barcode, and a watermark. Alternatively, the information carrier may be a remotely readable device such as an RFID tag. In the preferred embodiment, the information carrier is a barcode.

Figure 11:
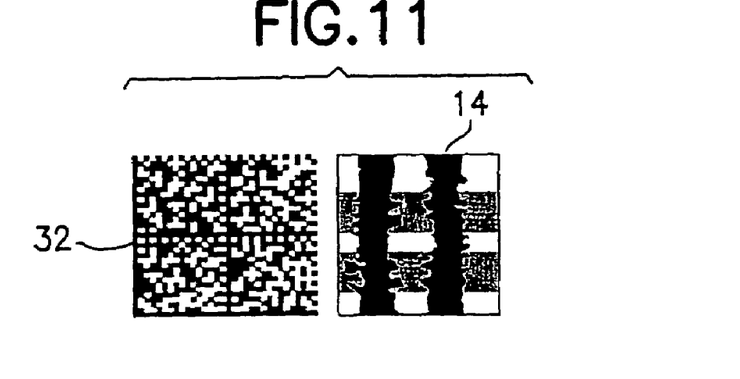
FIG. 11 shows an example of a seal in accordance with aspects of the invention.

FIG. 11 shows an example of a seal 14, wherein the random bleed part of the seal 14 may be printed first, and then scanned. The identifying code 26 may be extracted from the scanned image including information about the print quality and the coordinates. The identifying code 26 advantageously may be included in the message signed in the barcode 32.

Figure 12:
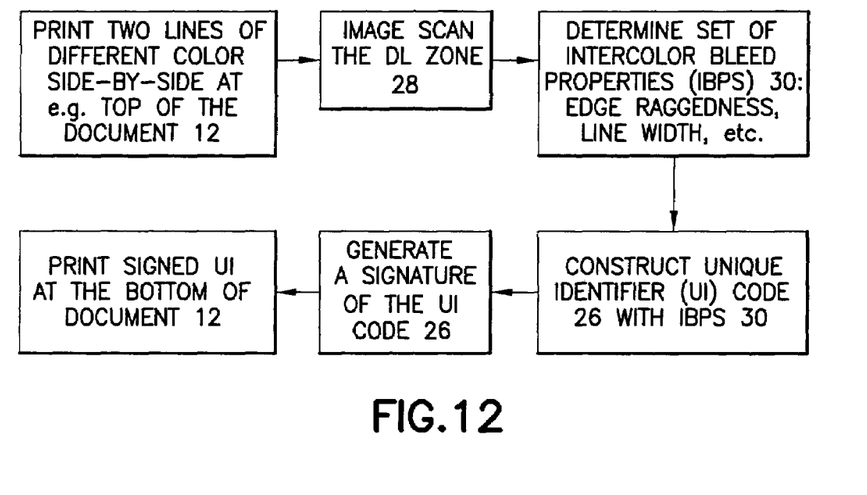
FIG. 12 schematically shows in block diagram form a method of creating a self-authenticating document in accordance with an embodiment of the invention.

FIG. 12 is a schematic illustration of an authentication process in accordance with an embodiment of the invention using the multiple inks, 18, 22. In accordance with this embodiment, an image is printed with side-by-side areas of different inks, 18, 22, that cause an intercolor bleed 24 to create authentication seal 14. The dried printed image that includes the intercolor bleed fingerprint is scanned. Intercolor bleed properties (IBPS) 30 are derived from the interface shape in a selected region (e.g. stable interface test region or DL zone 28) from analysis of the scanned image. The resulting interface description is used to generate a unique identifier (UI) code 26. An authentication authority can sign the UI code 26 and the signed UI code is printed on the document 12.

Figure 13:
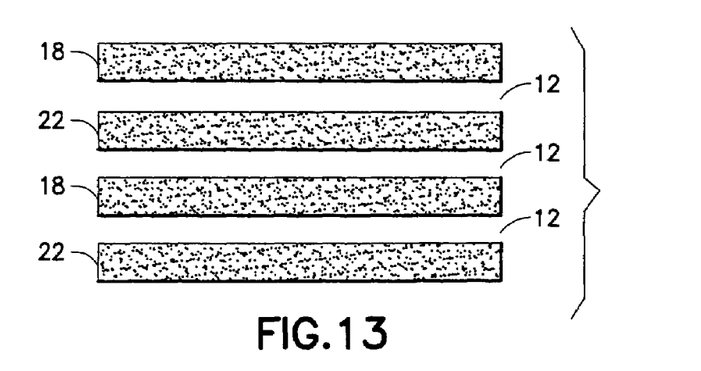
FIG. 13 shows a portion of an authentication seal 14 in accordance with an embodiment of the invention.

FIG. 13 illustrates a pattern that may be employed as an authentication seal 14, such as test region 28. As shown therein, rather than a line, a test pattern in the form of multiple horizontal bars can be used that has features that are sensitive to the bleed properties. The image in FIG. 13 can detect, for example, the interface effect of the two inks, 18, 22, as well as any bulk effects. This figure shows a schematic of edges between two inks and edges between ink and a paper substrate.

In an alternative authentication process in accordance with an embodiment of the invention, a remote verification seal code 34 may be created, which is not located on the document 12. Remote verification seal code 34 comprises the same code information as the UI code 26 and may be stored in any way or printed on any desired remote substrate in any desired, size, shape, and form, such as in barcode form. Authentication seal 14 may be scanned and compared to the verification seal code 34 to determine if the information matches and thus the document 12 is authentic.

Figure 14:
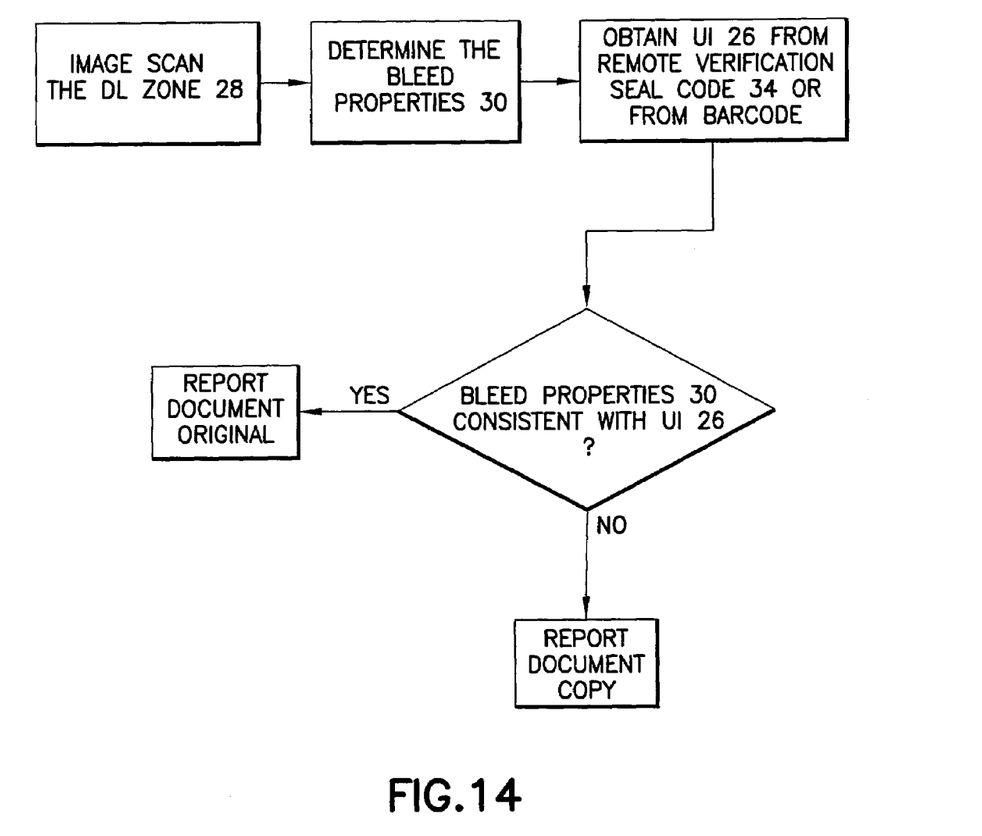
FIG. 14 schematically shows in block diagram form an authentication process also in accordance with an embodiment of the invention.

Thus, for verification of document 12, in accordance with an embodiment of the invention, the signed unique identifier code 26 may be read from the document 12, such as being read from barcode 32, and the test region 28 of the authentication seal 14 scanned. A preferred method is to analyze the resulting scan for consistency with the signed unique identifier code 26. An alternative is to generate the afore-referenced verification seal code 34 and verify that it is consistent with the signed unique identifier code 26. The preferred method removes the step of obtaining a verification seal code 34 in the authentication process as the signed unique identifier code 26 is compared directly with the image on the document 12 (e.g. authentication seal 14). FIG. 14 schematically shows an authentication process in accordance with afore-described embodiments of the invention.

Accordingly, embodiments of the invention advantageously provide processes in which an authentication seal 14 may be printed on a document 12. An image of the authentication seal 14 may be analyzed to determine a unique identifier code (UI) 26. The unique identifier code 26 may be encoded, for example, in a barcode 32 or stored elsewhere as a verification seal code 34. To authenticate the document 12, the authentication seal 14 may be scanned and bleed properties 30 compared to the unique identifier code 26 obtained from the barcode 32 or from the remote verification seal code 34.

Advantages of embodiments of the invention include the ease with which the authentication method may be implemented into existing document creation practices, and the difficulty with which it becomes to create fraudulent copies. Embodiments of the invention also benefit from enhanced signal detection due to the intercolor bleed behavior that multiplies the unique identifier effect from the media substrate local topology. Currently available image scanners can effectively and efficiently characterize/fingerprint the enhanced security features of the documents.

Moreover, in accordance with embodiments of the invention, the security feature is based upon the area where the intercolor or single ink bleeding occurs as opposed to the features of the substrate itself. The structure of the ink bleed emphasizes variability of the substrate, as well as the random diffusive process of ink bleeding.

It should be understood that the foregoing description is only illustrative of the invention. Various alternatives and modifications can be devised by those skilled in the art without departing from the invention. Accordingly, the present invention is intended to embrace all such alternatives, modifications and variances, which fall within the scope of the appended claims.

What is claimed is:

1. A method for creating a self-authenticating document comprising:

providing a base substrate forming the document;
printing an authentication seal on the document;
creating a bleed area on the authentication seal on the document with an ink where the ink and the substrate interact;
obtaining unique bleed properties of the bleed area by scanning the bleed area after termination of bleeding;
providing a description of the ink and substrate interaction;
generating an identifier code representing the unique bleed properties;
generating a signature of the identifier code;
encoding the signed identifier code in an information carrier;
associating the information carrier with the document;
storing the signed identifier code in a remote verification seal code that is not printed on the document;
scanning the authentication seal and the information carrier;
retrieving identifier codes of the scanned authentication seal and the scanned information carrier;
obtaining a comparison result by comparing the identifier codes of the scanned authentication seal and the scanned information carrier, and
determining authenticity of the document based on the comparison result.

2. The method of claim 1, wherein the authentication seal comprises a printed first portion comprising a first ink and a printed second portion adjacent the first portion and comprising a second ink, wherein the second ink is a different color than the first ink to create the bleed area which is an intercolor bleed area on the document where both inks and the substrate interact, the identifier code representing the unique bleed properties of the interaction between the inks and the substrate.

3. The method of claim 2, comprising scanning the authentication seal and comparing to a scan of the information carrier.

4. The method of claim 3, comprising printing dye based inks for the first ink and the second ink.

5. The method of claim 4, wherein the document is selected from the group consisting of a check, postal money order, mail piece and clothing tag.

6. The method of claim 4, wherein the authentication seal has a shape selected from the group consisting of square, rectangle, circle, and a pattern of horizontal lines.

7. The method of claim 4, wherein the properties comprise print quality parameters.

8. The method of claim 3, wherein the information carrier is selected from the group consisting of a barcode, text, a glyph, a watermark and a remote readable device.

9. The method of claim 8, wherein the information carrier is a barcode.

10. The method of claim 2, comprising scanning the authentication seal and comparing to the verification seal code.

11. The method of claim 10, wherein the information carrier is selected from the group consisting of a barcode, text, a glyph, a watermark and a remote readable device.

12. The method of claim 11, wherein the information carrier is a barcode.

13. A method for creating and verifying a plurality of self-authenticating documents, each self-authenticating document including an authentication seal, comprising:

providing a base substrate forming a first document;
printing a first authentication seal on the first document;

creating a first bleed area on the first authentication seal on the first document with an ink where the ink and the substrate interact;

obtaining first unique bleed properties of the first bleed area by scanning the first bleed area after termination of bleeding;

providing a description of the ink and substrate interaction;

generating a first identifier code representing the first unique bleed properties;

generating a first signature of the first identifier code;

encoding the first signed identifier code in a first information carrier;

associating the first information carrier with the first document;

storing the first signed identifier code in a first remote verification seal code that is not printed on the first document;

receiving a second self-authenticating document having a second authentication seal and a second information carrier;

scanning the second authentication seal and the second information carrier;

retrieving second identifier codes of the second scanned authentication seal and the second scanned information carrier;

obtaining a comparison result by comparing the second identifier codes of the second scanned authentication seal and the second scanned information carrier, and determining authenticity of the second document based on the comparison result.

14. A method for creating and verifying a plurality of self-authenticating documents, each self-authenticating document including an authentication seal, comprising;

providing a base substrate forming a first document;

printing a first authentication seal on the first document;

creating a first bleed area on the first authentication seal on the first document with an ink where the ink and the substrate interact;

obtaining first unique bleed properties of the first bleed area by scanning the first bleed area after termination of bleeding;

providing a description of the ink and substrate interaction;

generating a first identifier code representing the first unique bleed properties;

generating a first signature of the first identifier code;

encoding the first signed identifier code in a first information carrier;

printing the first information carrier on the first document;

receiving a second self-authenticating document having a second authentication seal and a second information carrier printed thereon;

scanning the second authentication seal and the second information carrier;

obtaining second identifier codes of the second scanned authentication seal and the second scanned information carrier;

obtaining a comparison result by comparing the second identifier codes of the second scanned authentication seal and the second scanned information carrier, and determining authenticity of the second document based on the comparison result.

15. The method of claim 14, wherein each authentication seal comprises a printed first portion comprising a first ink and a printed second portion adjacent the first portion and comprising a second ink, wherein the second ink is a different color than the first ink to create the bleed area which is an intercolor bleed area on the document where both inks and the substrate interact, the identifier code representing the unique bleed properties of the interaction between the inks and the substrate.

16. The method of claim 15, comprising printing dye based inks for the first ink and the second ink.

17. The method of claim 14, wherein the document is selected from a group consisting of a check, postal money order, mail niece and clothing tag.

18. The method of claim 14, wherein the authentication seal has a shape selected from a group consisting of square, rectangle, circle, and a pattern of horizontal lines.

19. The method of claim 14, wherein the properties comprise print Quality parameters.

20. The method of claim 14, wherein the information carrier is selected from a group consisting of a barcode, text, a glyph, a watermark and a remote readable device.

* * * * *